United States Patent

Mizutani

Patent Number: 5,602,432
Date of Patent: Feb. 11, 1997

[54] SILENT WARNING VIBRATION GENERATOR FOR PORTABLE EQUIPMENT

[75] Inventor: Nagao Mizutani, Sayama, Japan

[73] Assignee: Sayama Precision Industries Co., Ltd., Saitama, Japan

[21] Appl. No.: 288,566

[22] Filed: Aug. 10, 1994

[30] Foreign Application Priority Data

Aug. 11, 1993 [JP] Japan .................. 5-220657

[51] Int. Cl.⁶ .................................. H02K 33/00
[52] U.S. Cl. .................. 310/15; 310/17; 310/21; 310/29; 340/825.46
[58] Field of Search .................. 310/15, 17, 20, 310/21, 23, 29, 31, 34; 340/825.44, 825.45, 825.46

[56] References Cited

U.S. PATENT DOCUMENTS

| | | | |
|---|---|---|---|
| 2,632,791 | 3/1953 | Side | 175/41.5 |
| 3,333,219 | 7/1967 | Makino | 335/252 |
| 4,680,492 | 7/1989 | Tamura | 310/15 |
| 4,710,655 | 12/1987 | Masaki | 310/30 |
| 4,864,276 | 9/1989 | Tribbey et al. | 340/825.46 |
| 5,107,540 | 4/1992 | Mooney et al. | 340/825.46 |
| 5,172,092 | 12/1992 | Nguyen et al. | 340/825.44 |
| 5,327,120 | 7/1994 | McKee et al. | 340/825.46 |
| 5,361,243 | 11/1994 | Kasahara | 369/44.15 |

*Primary Examiner*—Thomas M. Dougherty
*Attorney, Agent, or Firm*—Koda and Androlia

[57] ABSTRACT

A vibration generator in a pager or massage device for giving vibration to the user including a coil fixed to a base and a movable member vibratably supported on the base. The movable member has inner and outer yokes defining therebetween a magnet gap in which the coil is inserted and a magnet for causing magnetic flux in the magnetic gap. A parallel four-bar linkage structure with a cantilevered leaf spring, a turnover leaf spring, or two diaphragm springs supports the movable member on the base.

12 Claims, 12 Drawing Sheets

5,602,432

SILENT WARNING VIBRATION GENERATOR FOR PORTABLE EQUIPMENT

BACKGROUND OF THE INVENTION

1. Field of the Invention

This invention relates to a vibration generator, and more particularly to a vibration generator, for a portable equipment, which is useful when embodied in a silent alerting device such as a small-size bell alarm.

2. Description of the Related Art

In the conventional silent alerting device such as a pager, a vibration generator is mounted in which a weight is attached to a driving shaft of a motor in a mass eccentric position. Having the weight mass eccentrically attached to the driving shaft of the motor, vibration will be generated when the motor is rotated, giving a calling indicator to a person carrying the alerting device. Therefore this silent alerting device has been widely used as a vibration generator for an equipment having a vibrator mechanism, such as a pager or a massage device.

Generally in a small-size motor for equipment control, for obtaining a large start torque, it is required that the inertial moment of a rotating portion is small. Consequently, attempts have been made to reduce the weight of a rotor and the radius of rotation. A cup-shape coreless motor satisfies the above requirement as it has no rotating iron core and hence the radius of a rotor (a cup with an armature coil wound around) is small. Further, the silent alerting device for a small-size pager requires a small-size and light-weight device which generates a vibration large enough to cause bodily sensation. Therefore in the silent altering device of a conventional pager, it is preferable to use a cup-type coreless motor.

In manufacturing the vibration generator of a pager motor, material is sintered into a weight shape using a mold and the sintered material is cooled, whereupon the driving shaft of the motor is forced into the driving-shaft insertion hole. At that time, a secondary process is necessary in order that the size of a core pin's bore defining the driving-shaft insertion hole should be equal to the diameter of the driving shaft of the motor. This secondary process is exemplified by cutting the inside wall of the bore to a required size using, for example, a reamer. In an alternative method, the driving shaft of the motor is inserted into a weight's bore larger than the diameter of the driving shaft, and then the bore is clenched with a pin stop and by punching.

However, with the conventional silent altering device using a cup-type coreless motor, the following problems have been experienced. First of all, because a pager is to be carried by the user in his/her pocket, a small-size and light-weight pager is preferred. However, as long as a rotating mechanism is absolutely essential, there exists a limit in reducing the size of a cup-type coreless motor. As it uses a battery, the conventional silent altering device should preferably be of a low-energy-consuming type. Nonetheless using a cup-type coreless motor results in a relatively large consumption of power. As a general characteristic, a d.c. motor needs a large starting current. For the latest pager batteries, air cells are widely used as they are advantageous from size and weight view points, but an air cell is poor in supplying a large current, so this restriction to the starting current causes a malfunction of the motor. With this type of motor, particularly mechanical losses which occur in the bearings, brushes, etc. are significantly large. Further, in the brush section, electromagnetic noise will develop due to sparks, and the brush will wear out sharply with only a short life. Since the weight is attached to the driving shaft of the motor in a mass-eccentric position, the direction of vibration is changing all times so that an effective warning is difficult to achieve.

Further, in the conventional vibration generator mechanism, for production of the weight it is very difficult to make a motor-driving-shaft insertion hole, i.e., a bore in the core pin, and precise forced insertion management is impossible and must rely on secondary machining by, for example, a reamer. According to the method of clenching the bore, partly since the size of core pin bore formed in the weight does not coincide with the diameter of the driving shaft of the motor, and partly since the weight is fixed to the driving shaft of the motor by clenching, the driving shaft tends to be curved due to the clenching force so that the motor will suffer destructive damage. By the way, in the method of forming the vibration generator of the conventional pager motor, it is impossible to form the bore to an accurate size solely by primary machining, which requires some secondary machining, thus causing a poor rate of production and hence a high manufacturing cost.

There also exists a type of vibration generator where the movable member is supported by two or more leaf springs on either side of the coil. This technology, however, has the disadvantage that a large component of the vibration is non-linear. This non-linear motion component causes stress within the spring components and considerable friction between mechanical parts, thereby reducing operating life and reliability. In conventional alert systems of this type, this extra motion component is limited by pins or supports, which results in increased friction and power consumption, or by increasing the space between the movable member and coil, thereby increasing the size of the device and decreasing its unity.

SUMMARY OF THE INVENTION

It is therefore an object of this invention to provide a silent warning vibration generator, for a portable equipment, which is easy to manufacture, low in cost, small in size and thickness, has low electric power consumption, less mechanical loss, is free of electromagnetic wave noise due to sparking, has long life and enables limiting the direction of vibration to a predetermined direction, eliminating the foregoing problems with the conventional art in which an mass-eccentric weight is attached to the driving shaft of a motor.

The above object is accomplished by a vibration generator comprising an inertial member, which has a permanent magnet and a yoke defining a magnetic gap, a coil inserted into the magnetic gap in a non-contact state so as to cross magnetic flux in the gap, and a vibration member connecting the inertial member and the coil with one another for vibrating them relative to one another to make a vibration when an electric current flows in the coil. According to the present invention, part of the vibrating plate is a leaf spring, and the leaf spring is composed of a central section and two outer side sections Joined together at one end of each, in order to have a long extended length. The coil is supported by the other ends of the side sections of the leaf spring and the vibrating plate is a parallel four-bar linkage structure in which turning pairs are resilient. The Joints and connecting sections are integral.

Partly since the coil is inserted in the magnetic gap of the inertial movable member having the permanent magnet, and partly since the coil and the inertial movable member are operatively connected with one another via the vibrating plate, the coil and the magnetic gap are kept stationary, with no strain exerted on the vibrating plate, before an electric current flows in the coil. Assuming that an electric current flows in the coil in a magnetic field, then this simulates the moving-coil-type electrical-to-mechanical converter. Lorentz force is generated acting on the coil and the inertial movable member to change their relation positions, thus deforming the vibrating plate in the direction allowed by the four-bar linkage. If the current flow in the coil is stopped, the positional relationship between the coil and the magnetic gap will restore to its initial state as the vibrating plate is normally urged to its original position. In short, by switching on to supply a current to the coil, a vibration will be generated. By selecting a suitable resonant frequency of the vibrating system composed of the coil, the movable inertial member and the vibrating plate, it is possible to reduce the current, which is to be applied to the coil, to a very small value in order to give a desired warning vibration.

DETAILED DESCRIPTION

Figure 1:
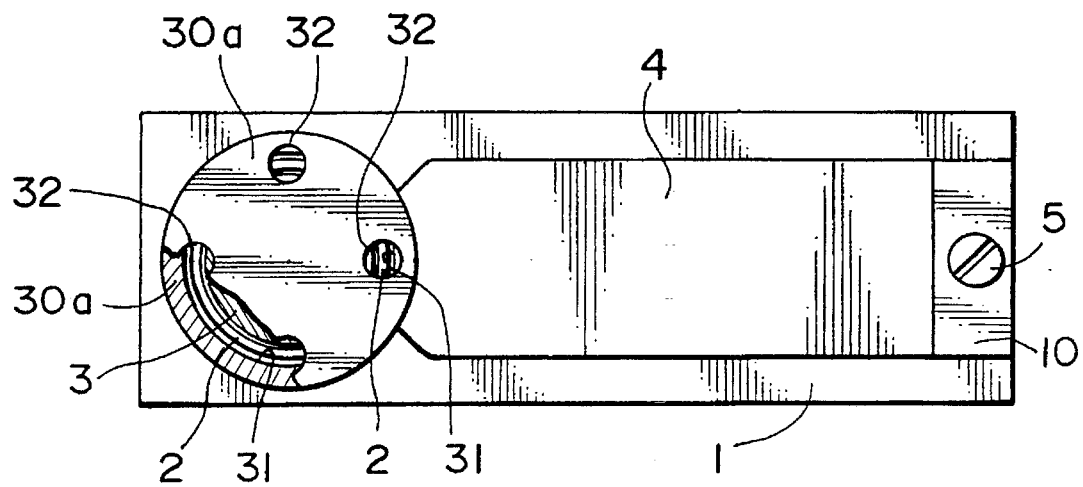
FIG. 1 is a plan view, partially in cross section, of a vibration generator according to a first embodiment of this invention, in which a movable member is supported by a cantilevered support spring.

Various embodiments of this invention will now be described with reference to the accompanying drawings, but this invention should by no means be limited to these illustrative examples.

FIGS. 1 through 4 show a first embodiment of the invention, in which a cylindrical coil 2 is mounted on a square synthetic resin base 1 at one end and a spacer 10 at the other end. A metallic leaf spring 4, supporting on one end a circular permanent magnet 3 of rare earth magnet, such as samarium cobalt, is fixed at the other end to the spacer 10 by a screw 5.

As is apparent from this embodiment, in fact, a cup-shape outer yoke 30a is fixed to one end of the leaf spring 4, and the permanent magnet 3 is fixed to the outer yoke 30a. To the surface of the permanent magnet 3, a disc-shape inner yoke 30b is fixed. There is defined between the outer and inner yokes 30a, 30b a ring-shape magnetic gap 31 into which magnetic flux of the permanent magnet 3 is led. The permanent magnet 3 is in the form of a thin disc magnetized axially, causing magnetic force lines radially in all directions in the magnetic gap 31.

Figure 2:
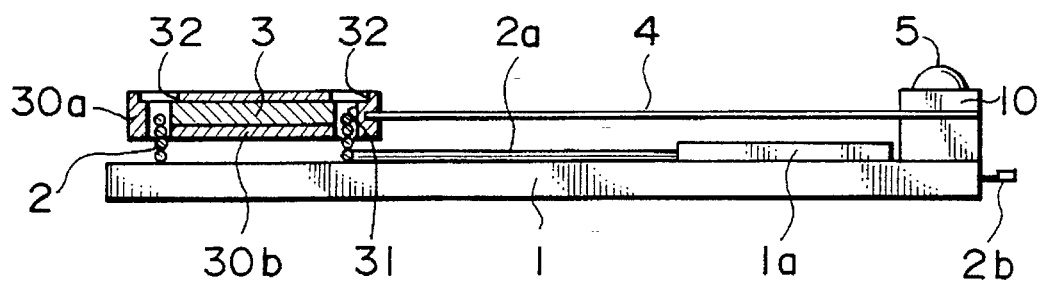
FIG. 2 is a front view, with parts broken away, of the first embodiment, showing the movable member in a stationary state.

As shown in FIG. 2, the gap 31 is in alignment with the coil 2, and in assembling, the coil 2 is inserted as a conductor. Therefore, as described below, when an electric current is supplied to the coil 2, an inertial movable member, which is composed of the leaf spring 4, the outer and inner yokes 30a, 30b and the permanent magnet 3, will be driven axially of the permanent magnet 3.

In the first embodiment, since the gap between the coil 2 and the outer and inner yoke 30a, 30b is set to, for example, 0.05 to 0.1 mm with the coil 2 inserted in the magnetic gap 31, the movement of the movable parts will be restricted by the resistance of air confined in the magnetic gap 31. Consequently, the outer yoke 30a has four air escape holes 32 in alignment with the ring-shape magnetic gap 31 to reduce the air resistance. Thus the disc-shape yoke 30b is retractably inserted in the coil 2.

Included in the vibration generator is a driver circuit, built into an IC 1a, as shown in FIG. 2. The IC 1a is fixed to or molded integrally on a base 1. The coil 2 is connected to the IC 1a by a lead line 2a, with a lead terminal 2b outgoing from a trailing end of the base 1.

Figure 3:
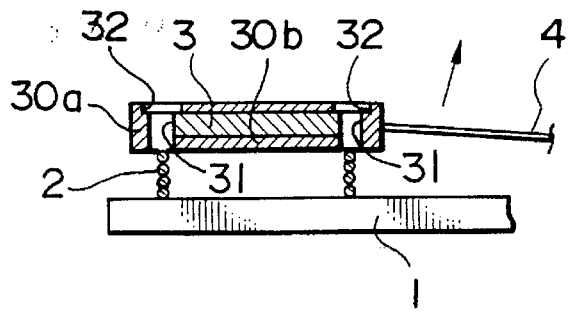
FIG. 3 is a part of FIG. 2, but showing the movable member having been moved upwardly.
Figure 4:
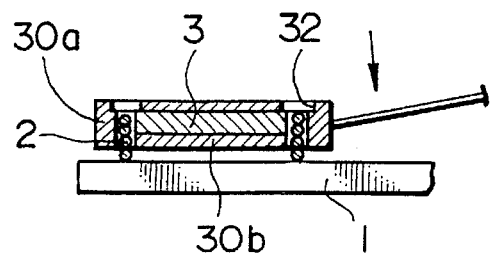
FIG. 4 is a fragmentary cross-sectional view of the first embodiment in a driven state, showing the movable member having been moved downwardly.

With this arrangement, since the coil 2 and the permanent magnet 3 are operatively connected with one another via a leaf spring as the vibrating plate, the coil 2 and the permanent magnet 3 are kept stationary relative to one another, with no strain exerted on the vibrating plate, before an electric current flows in the coil. Now assuming that an alternating current of a frequency resonant with the movable parts, namely of about 100 Hz, is supplied to the coil 2, the coil 2 and the magnetic gap 31 will be moved toward and away from each other repeatedly against the resilience of the leaf spring 4 by the Lorentz force that is generated between the coil 2 and the magnetic gap 31 in the presence of the magnetic gap's magnetic flux perpendicularly crossing the coil 2, thus causing a vibration in a direction perpendicular to the base 1, as shown in FIGS. 3 and 4. Since the vibrating leaf spring 4 restores to its original state when the current flow into the coil 2 is stopped, the coil 2 and the permanent magnet 3 return to their initial positions. Since the coil 2 is attached to the synthetic resin base 1, the movable parts can be regarded as those including the leaf spring 4. During the vibration, since the air existing in the magnetic gap 31 between the permanent magnet 3 and the yoke 30a goes in and out via the air escape hole 32, the coil 2 serves as a piston to compress the air, preventing the vibration of the leaf spring 4 from being deteriorated.

As is apparent also from the drawings, this embodiment, unlike the conventional art using the pager motor, is simple in structure, easy to manufacture and low in cost. The whole structure of this embodiment is small-sized having a very small thickness, which only causes the Lorentz force between the coil 2 and the permanent magnet 3 so that the resilience of the leaf spring 4 can be utilized, thus reducing electric power consumption. Since there is no bearing and brush, this embodiment is almost totally free from mechanical losses so that electromagnetic wave noise is unlikely to occur due to sparks between the contacts. Since no exist rotating part or wearing brush exists, it is possible to improve durability. Further, since the movable member is vibrated only in a direction perpendicular to the base 1, it is possible to give an effective warning to the user if he/she carries the vibration generator with the base 1 facing his/her body. And since the permanent magnet 3 which is relatively heavy in weight is attached to the movable part vibratably supported by the leaf spring 4, a vibration large enough for bodily sensation can be obtained. Especially using the permanent magnet 3 of samarium cobalt, it is possible to secure a large force of inertia of the inertial movable member.

In the vibration generator of the first embodiment, assuming that the amplitude of vibration of the leaf spring 4 is increased in an attempt to obtain a large vibration for bodily sensation, the entire length of the leaf spring 4 must be increased to a much further extent. However, the longer the entire length of the leaf spring 4, the larger the size of the vibration generator. If the amplitude of vibration of the leaf spring 4 is large, the permanent magnet 3 will move so as to describe a large arc with the screw 5 as a fulcrum. In order to keep the yoke 30b out of contact with the coil 2, it is required that the width of the magnetic gap 31 between the permanent magnet 3 and the yoke 30b is large. As a result, the overall size of the vibration generator would be increased, and the magnetic flux density would become small, thus lowering electromagnetic transduction efficiency.

Figure 5:
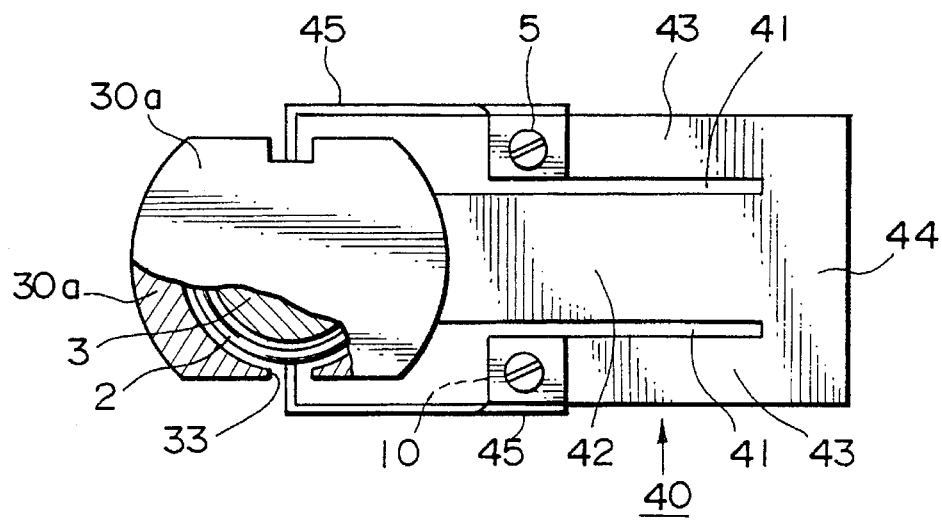
FIG. 5 is a plan view, with parts broken away, of a second embodiment, in which a movable member is supported by a folded spring.
Figure 6:
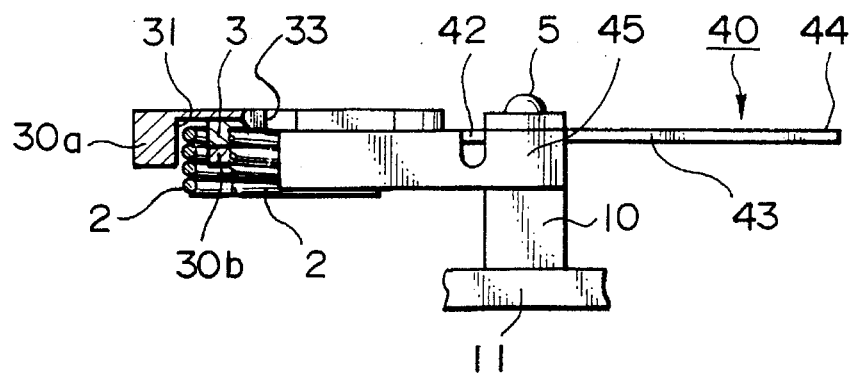
FIG. 6 is a front view, with parts broken away, of the second embodiment, showing the movable member in a stationary state.

As a solution to this problem, a second embodiment of this invention will now be described using FIGS. 5 and 6. The second embodiment is characterized in that the leaf spring 40 supporting the movable member has substantially an E shape defining two slits 41. Namely, it is composed of a central section 42 and two turnover side sections 43 at one end, thus causing an increased extended length. Further, the central section 42 extends beyond the outer side sections 43 in a tail shape from the supporting portion in the direction opposite to the yoke and the magnet, and the ends of the outer side sections 43 of the leaf spring 40 are fixed to a casing 11 of the pager via a spacer 10 by a screw 5 while the end of the central section 42 of the leaf spring 40 supports a circular permanent magnet 3 of samarium cobalt via the outer yoke 30a. The coil 2 is supported on the casing 11 by the extension of the leaf spring 40. Namely, the ends of the outer side sections 43 fixed to the spacer 10 extend outside and parallel to the central section 42 with a difference in level therefrom and are bent downwardly by a right angle to form supporting portions 45 holding the coil 2. Though it is made of the leaf spring 40, the right-angled supporting portions 45 have adequate rigidness so that they are prevented from being vibrated. The outer yoke 30a has, at opposite end portions, cutaways 33 for the passage of the supporting portions 45 toward the coil 2 and for air existing in the magnetic gap 31 to freely go in and out.

With this arrangement, though the entire extended length of the leaf spring 40 is a composite length of the outer side sections 43 and the central section 42, the fulcrums of vibration are the screw 5 of the spacer 10 and the outer edge 44 of the leaf spring 40. The arc the opposite outer side sections 43 of the leaf spring 40 describes with the screw 5 as the fulcrum is directed opposite to the arc the central section 42 of the leaf spring 40 describes with the outer edge 44 as the fulcrum, thus causing a vibration in which the permanent magnet 3 moves into and out of the coil 2 substantially parallel thereto. The amplitude of this vibration would be very large since the entire extended length of the leaf spring 40 is a composite length of the outer side sections 43 and the central section 42. Since the stationary side coil 2 and the movable parts including the magnet 3 are supported on the casing 11 only by the leaf spring 40, it is possible to reduce the overall number of parts of the generator, thus making the generator small in size and light in weight.

Figure 7:
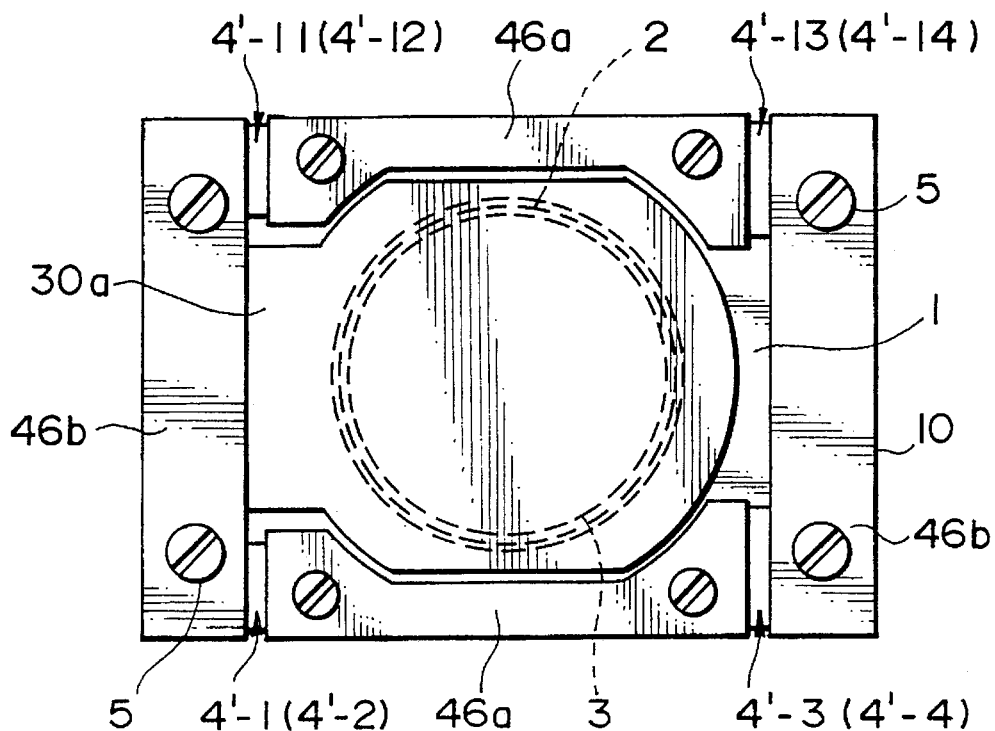
FIG. 7 is a plan view of a third embodiment, in which a movable member Is supported by two four-bar linkages.
Figure 8:
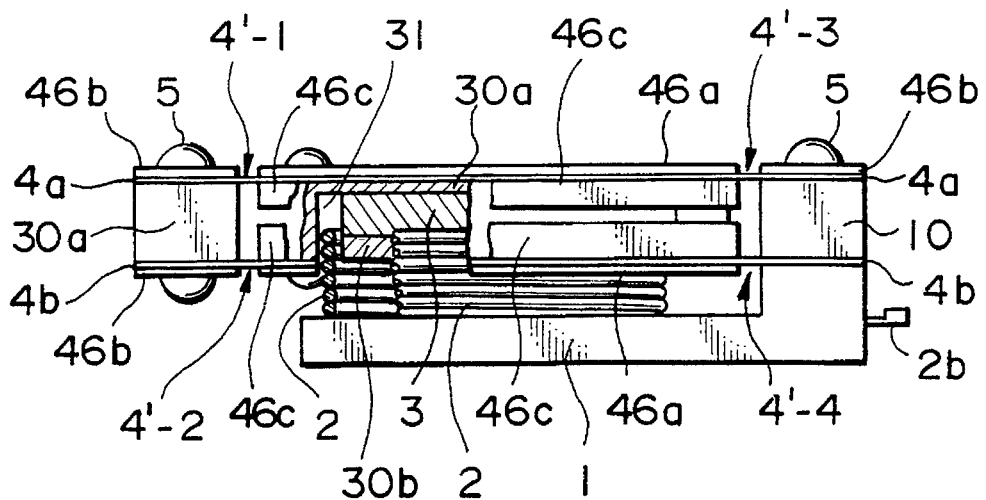
FIG. 8 is a plan view, with parts broken away, of the third embodiment, showing the movable member in a stationary state.
Figure 9:
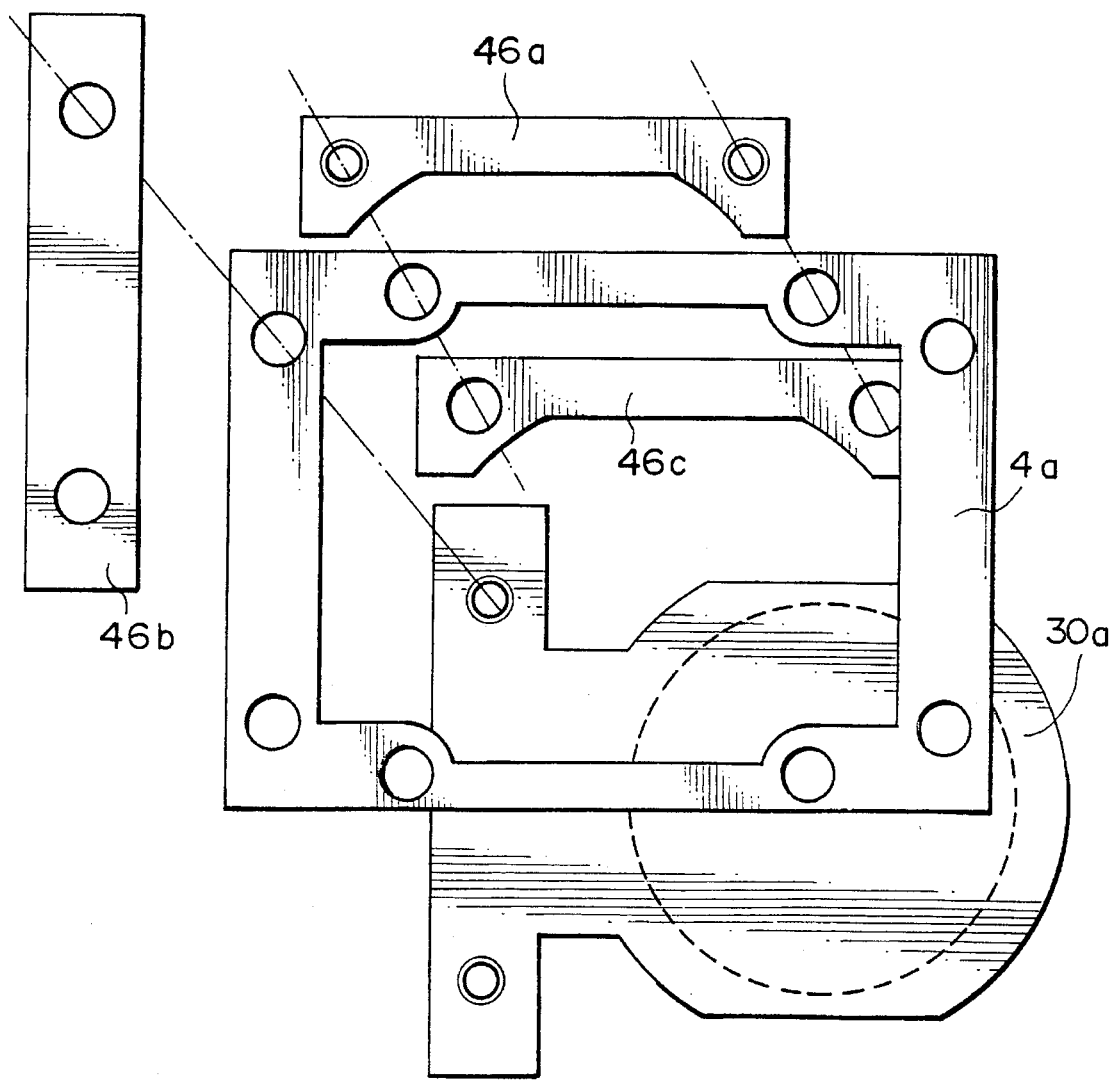
FIG. 9 is an exploded perspective view showing an outer yoke, a rectangular frame-shape leaf spring and a part of bar-forming sections, all of the third embodiment.

A third embodiment of this invention will now be described using FIGS. 7, 8 and 9. The third embodiment is characterized in that the vibrating support member for vibrating the circular permanent magnet 3 of samarium cobalt, the outer yoke 30a and the inner yoke 30b is a parallel four-bar linkage structure with the leaf spring 4 having four connecting sections 4' corresponding to the turning pairs as shown in FIG. 8. In this embodiment, one end of the cup-shape outer yoke 30a has a generally T-shape extension as shown in FIG. 9, the generally T-shape section being supported by the parallel four-bar linkage structure. The parallel four-bar linkage structure of this invention is composed of an upper linkage and a lower linkage as shown in FIGS. 7 and 9, and consequently two leaf springs 4a, 4b are used. In FIG. 9, only one of the leaf springs 4b is shown, and the two leaf springs 4a, 4b are spaced apart and parallel to each other as shown in FIG. 8. This leaf spring pair respectively supports the opposite ends of the generally T-shape sections of the outer yoke 30a as the four-bar linkage structure. More specifically, the generally T-shape section of the outer yoke 30a is sandwiched between upper and lower rectangular frame-shape leaf springs 4a, 4b, and bar-forming plates 46b are placed over the top section of the outer yoke 30a and fastened by screws 5. The outer yoke 30a is in the form of a downwardly opening circular cup having a circular magnetic gap 31 in which the coil 2 is to be inserted from the under side. Inside the magnetic gap 31, the permanent magnet 3 having a diameter smaller than that of the coil 2 is mounted. Over the under surface of the permanent magnet 3, the disc-shape inner yoke 30b equal in diameter to the permanent magnet is placed. The opposite side sections of the rectangular leaf springs 4a, 4b are sandwiched between the bar-forming plates 46a, 46c and are fastened by screws 5. On the other hand, the base-side sections of the rectangular leaf springs 4a, 4b on the base side, as is apparent from FIG. 8, are sandwiched between the bar-forming section 46b and the spacer 10 and one end of a square synthetic resin base 1 by screws 5. The exposed portions of the leaf springs 4a, 4b at opposite ends of the bar-forming plates 46a are supported by inertial movable members, i.e. the permanent magnet 3 and the yokes 30a, 30b by two parallel four-bar linkages, i.e. a set of four bars 4'-1, 4'-2, 4'-3, 4'-4 and a set of four bars 4'-11, 4'-12, 4'-13, 4'-14, with turning pairs as connecting sections 4'. The cylindrical coil 2 is mounted centrally on the base 1 and is inserted in the magnetic gap 31.

In FIG. 8, a driver IC 1a is molded inside the base 1, and a power terminal 2b leads outwardly from the trailing end of the base 1.

The number of vibrating plates connecting the coil and the permanent magnet should by no means be limited to one, and alternatively a set of upper and lower vibrating plates may be used and their shape may be selected as desired. It is also preferable that they constitute a parallel four-bar linkage. With the parallel four-bar linkage structure, since the magnetic gap 31 normally is moved in parallel to the coil 2 so as not to come into contact with the coil 2, it is possible to reduce the width of the magnetic gap 31 to a minimum, thus realizing a thin and compact vibration generator with an increased mechanical reliability. In the first and second embodiments, the coil 2 and the permanent magnet 3 are connected with one another at outer spaced positions via the vibrating plates 4, 40. In this case, in order to obtain an appropriate vibration, the vibrating plates 4, 40 requires a somewhat large length. Basically the same thing can be said in the third embodiment. In a fourth embodiment described below, the coil 2 and the permanent magnet 3 are located centrally between opposite connecting portions of the vibrating plates, thus realizing a further increased size of vibration generator.

Figure 10:
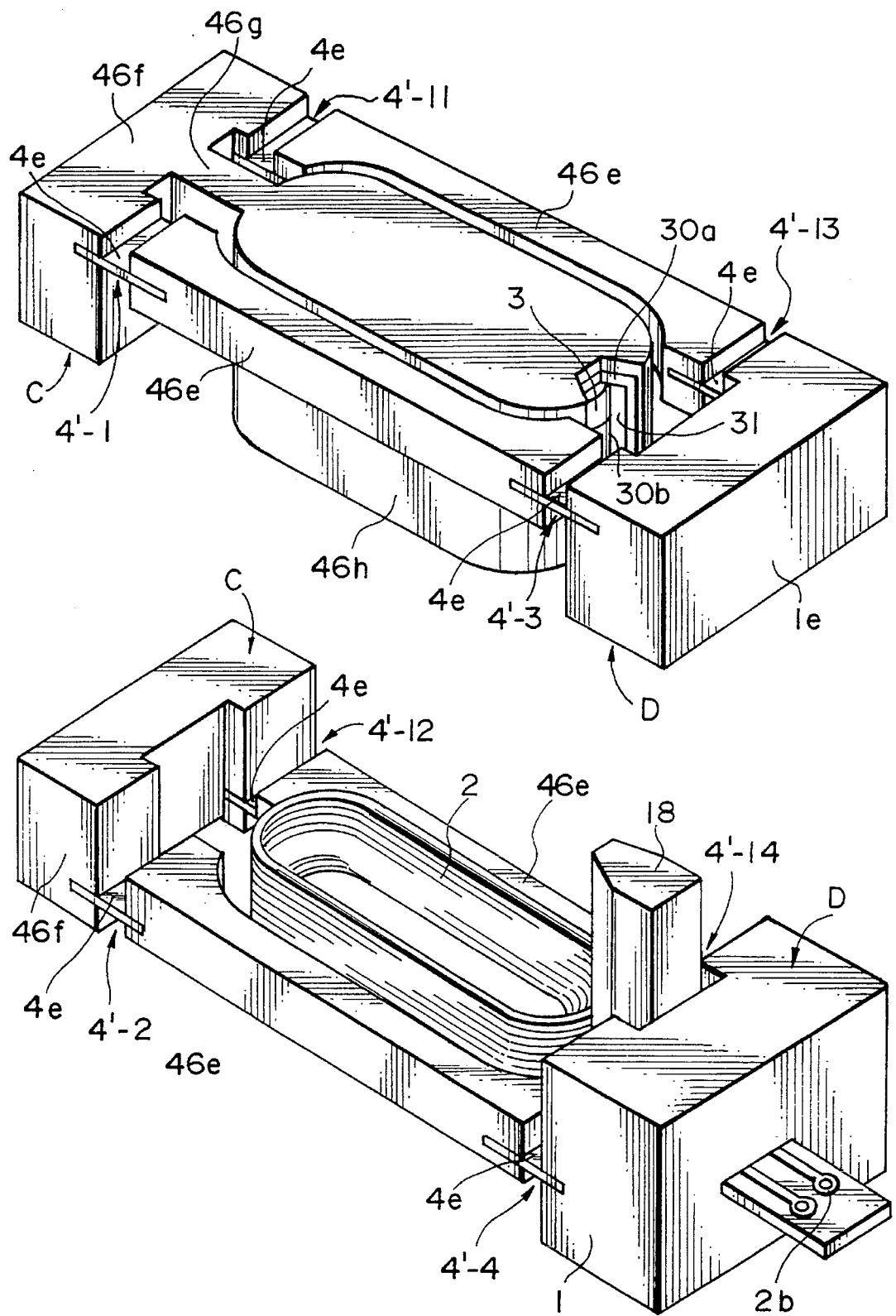
FIG. 10 is an exploded perspective view of a fourth embodiment, in which bar connecting plates are supported by respective leaf springs insert-molded on a plastic base, and a movable member is supported by two parallel four-bar linkages.
Figure 11:
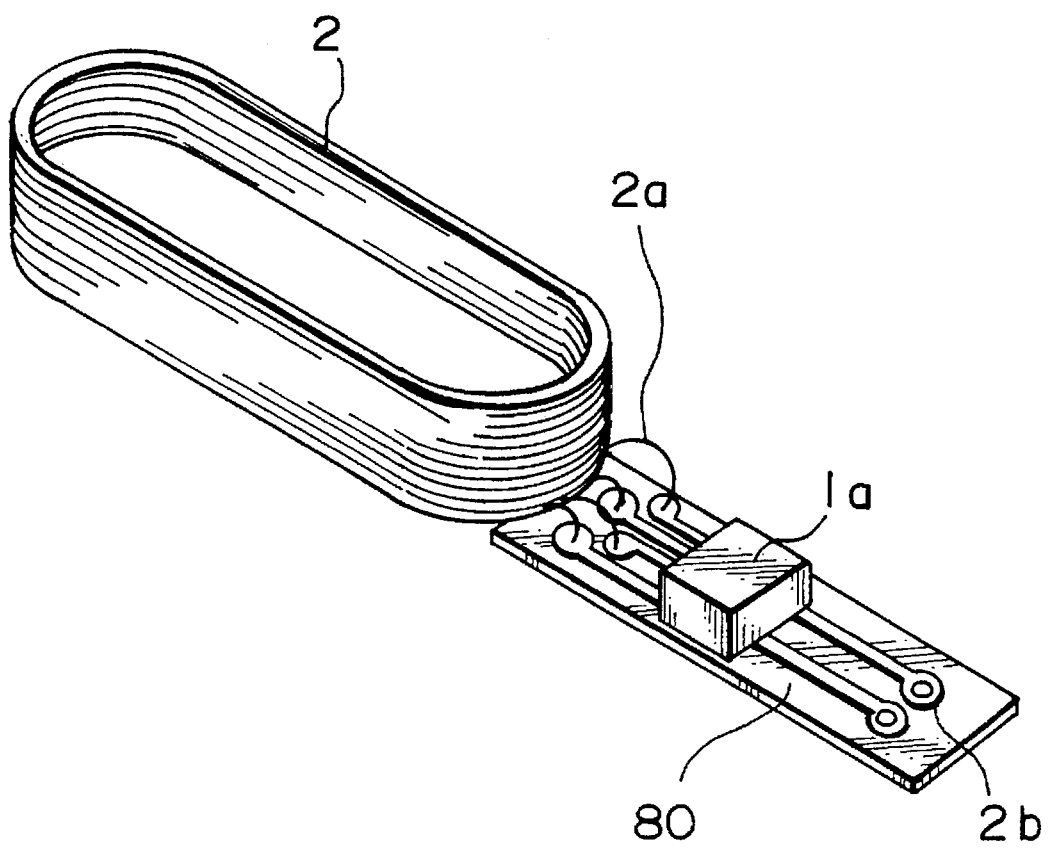
FIG. 11 is a perspective view showing the connecting relationship between a coil and a driver IC in the fourth embodiment.

FIGS. 10 and 11 are exploded perspective views showing a fourth embodiment of this invention. This embodiment, like the third embodiment, has two parallel four-bar linkages so that the movable member can be vertically vibrated in parallel to the coil. As is apparent from FIG. 10, the vibration generator of this embodiment is divided into upper and lower blocks. In the lower block, the coil 2 is fixed to the base 1 via a connecting member 18. The upper block has an upper base 1e to be fixed to the base 1 by gluing or ultrasonic welding. In assembling, the upper and lower blocks are fixed firmly to each other with their Joining surfaces C and D.

A bar-forming plate 46f is vibratably supported on the upper member 1e via two links. Two bar-forming plates 46e are situated between the upper base 1e and the bar-forming plate 46f. Leaf springs 4e are insert molded between the upper base 1e and opposite bar-forming plates 46e, forming a turning pair 4'-3, 4'-13 therebetween. Likewise, leaf springs 4e are insert molded between the bar-forming plate 46f and opposite bar-forming plates 46e, forming a turning pair 4'-1, 4'-11. Therefore, the bar-forming plates 46 can easily be moved upwardly and downwardly with respect to the upper base 1e by each turning pair 4'.

An oval cup-shape holder 46h is molded integrally with the bar-forming plate 46f via a connecting portion 46g. On the inner wall of the yoke holder 46h, an outer yoke 30a having a cup shape is placed. Centrally on the yoke holder 46h, an oval permanent magnet 3 is fixed. On the surface of the permanent magnet 3, an oval inner yoke 30b is placed. Accordingly, an oval ring-shape magnetic gap 31 is formed between the outer and inner yokes 30a, 30b, and the coil 2 is inserted in the magnetic gap 31 with the upper base 1e joined to the base 1 at their joining surfaces D.

Only in the upper block, although the movable parts, i.e. the bar-forming plates 46e, 46f, the yoke holder 46h, the leaf spring 4e, the outer yoke 30b, the permanent magnet 3 and the inner yoke 30b, can only be vibrated with respect to the upper base 1e, the outer and inner yoke 30a, 30b would make an arcuate movement. Consequently, in this embodiment, two linkages are situated on the lower block for moving the movable parts in parallel.

As is apparent from FIG. 10, in the lower block, like the upper block, the leaf springs 4e are insert molded between the base 1 and the bar-forming plates, and likewise the leaf springs 4e are insert molded between the bar-forming plates 46e and the bar-forming plate 46f. The bar-forming plates 46e are Joined together at their Joining surfaces C by gluing or ultrasonic welding, thus supporting the movable parts so as to be vertically movable on the base 1 by two parallel four-bar linkages. The movable parts of each of the two parallel four-bar linkages are composed of turning pairs. The first parallel four-bar linkage is composed of turning pairs 4'-1, 4'-2, 4'-3, 4'-4, and the second parallel four-bar linkage is composed of 4'-11, 4'-12, 4'-13, 4'-14. The bar-forming plates 46e, 46f of the lower block and the leaf springs 4e, as supported by the two parallel four-bar linkages, constitute part of the inertial movable parts.

As is apparent from FIG. 11, the coil 2 is fixed to the base 1 by the supporting member 18, and part of the coil 2 is fixed to a flexible print circuit (FPC) 80, on which an IC 1a with a built-in driver circuit is mounted. The coil 2 is electrically connected to the IC 1a via a lead line 2a, and the IC 1a is connected to an external electric circuit on the FPC 80 via an terminal 2b. Accordingly, if the FPC 80 such as shown in FIG. 11 is insert molded in the base 1, it is possible to integrally incorporate the electric driver circuit for the coil 2 in the vibration generator with maximum ease.

Figure 12:
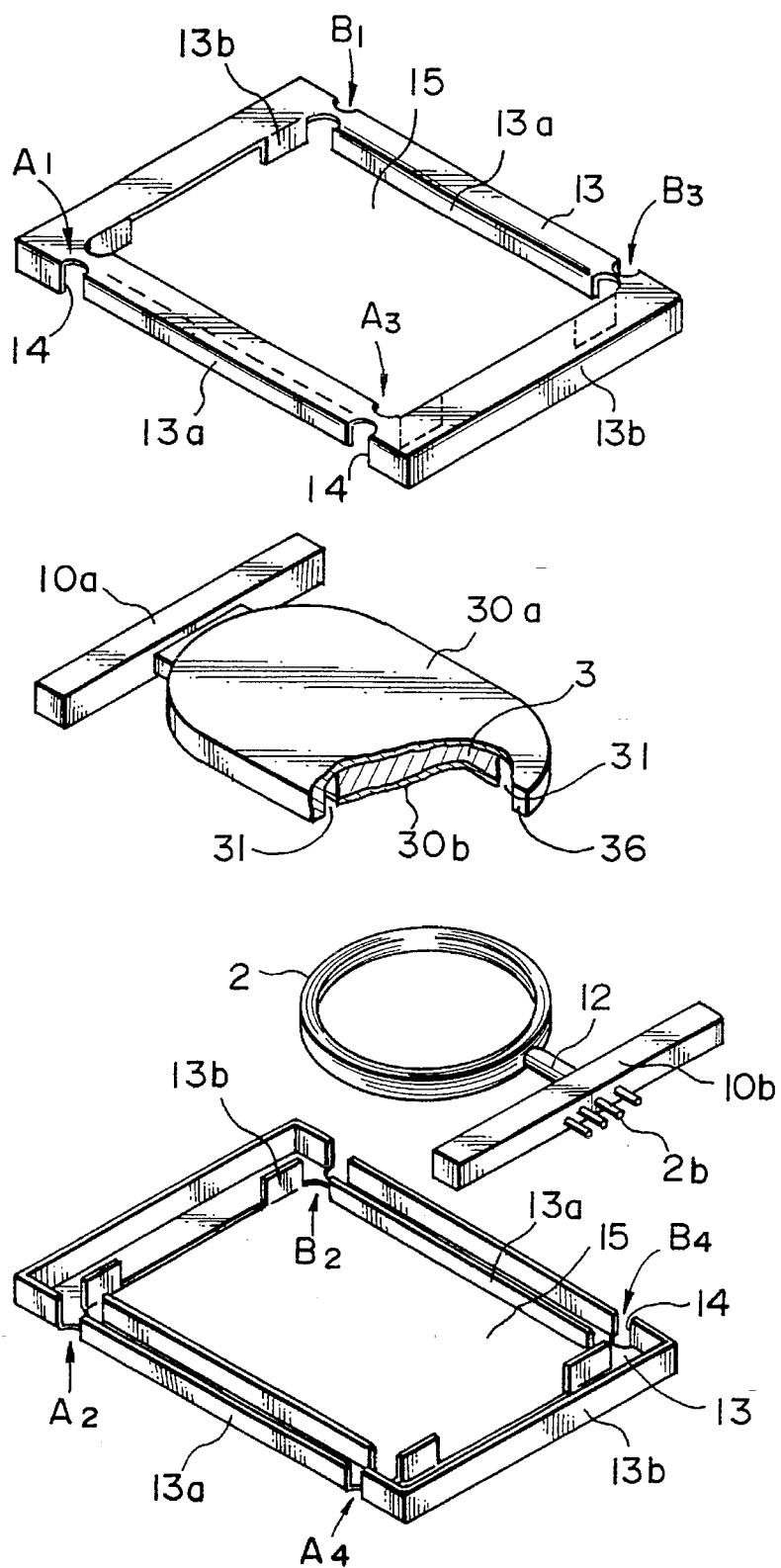
FIG. 12 is an exploded perspective view of a fifth embodiment, in which two four-bar linkages are composed of leaf springs bent into two casings.

FIG. 12 is an exploded perspective view of a vibration generator according to a fifth embodiment of this invention. In the vibration generator of this embodiment, two opposed casings 13 of identical shape each have a central opening 15, two cutaways 14 in each of opposite side members, and bent walls 13a, 13b in outer and inner portions. In the casings 13, a coil 2, a cylindrical permanent magnet 3 of samarium cobalt, and outer and inner yokes 30a, 30b are accommodated. The outer yoke 30a has a cup shape, and the permanent magnet 3 of a diameter smaller than that of the coil 2 and the inner yoke 30b placed on the magnet 3 are mounted inside the outer yoke 30a so as to have a magnetic gap 31 around the magnet 3. A support spacer 10a is mounted on one end of the outer yoke 30a. The cylindrical coil 2 to be inserted in the gap 31 between the outer and inner yokes, 30a, 30b is fixed to the distal end of a supporting portion 12 projecting centrally from a support spacer 10b corresponding to the support spacer 10a. The side wall of the outer yoke 30a has a cutaway 36 through which the supporting portion 12 is to extend.

Figure 13:
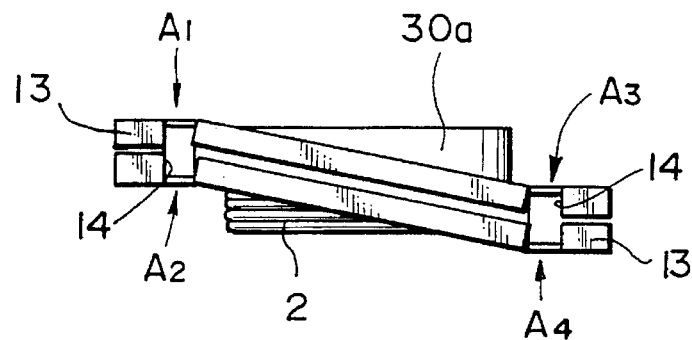
FIG. 13 is a front view schematically showing the state of vibration in fifth embodiment.

According to this embodiment, since the coil 2 and the permanent magnet 3 are joined together via the upper and lower resilient thin metallic casings 13 serving as the vibrating plates, the coil 2 and the permanent magnet 3 are kept stationary with the casings free from any strain before an electric current flows in the coil 2. Now assuming that an alternating current is supplied to the coil 2, an alternating magnetic field will be caused in the coil 2. Because the coil 2 exists in the magnetic gap 31 chiefly defined by the permanent magnet 3, a relative force will act between the coil 2 and the outer and inner yoke 30*a*, 30*b* in a direction perpendicular to the magnetic force lines so that the coil 2 and the magnetic gap 31 will be repeatedly moved vertically relative to each other against the resilience of the casings 13, thus vibrating the casings 13 axially of the coil 2. Then, when the current flow to the coil 2 is cut off, the vibrating casings 13 will restore to their original positions so that the coil 2 and the magnetic gap 31 will return to their original positions. FIG. 13 shows the state in which a repulsive force has occurred between the coil 2 and the permanent magnet 3 to cause the coil 2 and the permanent magnet 3 to move away from each other against the resilience of the casings 13. At that time, the two casings 13 are folded, while biased, from two cutaways 14 of the opposite side portions. In FIGS. 12 and 13, four turning pairs A1, A2, A3, A4 jointly constitute the first parallel four-bar linkage, and other four turning pairs B1, B2, B3, B4 jointly constitute the second parallel four-bar linkage. In FIG. 12, part of the outer yoke 30*a* projects outwardly from the opening of the upper casing 13, while part of the coil projects outwardly from the opening 15 of the lower casing 13.

Figure 14:
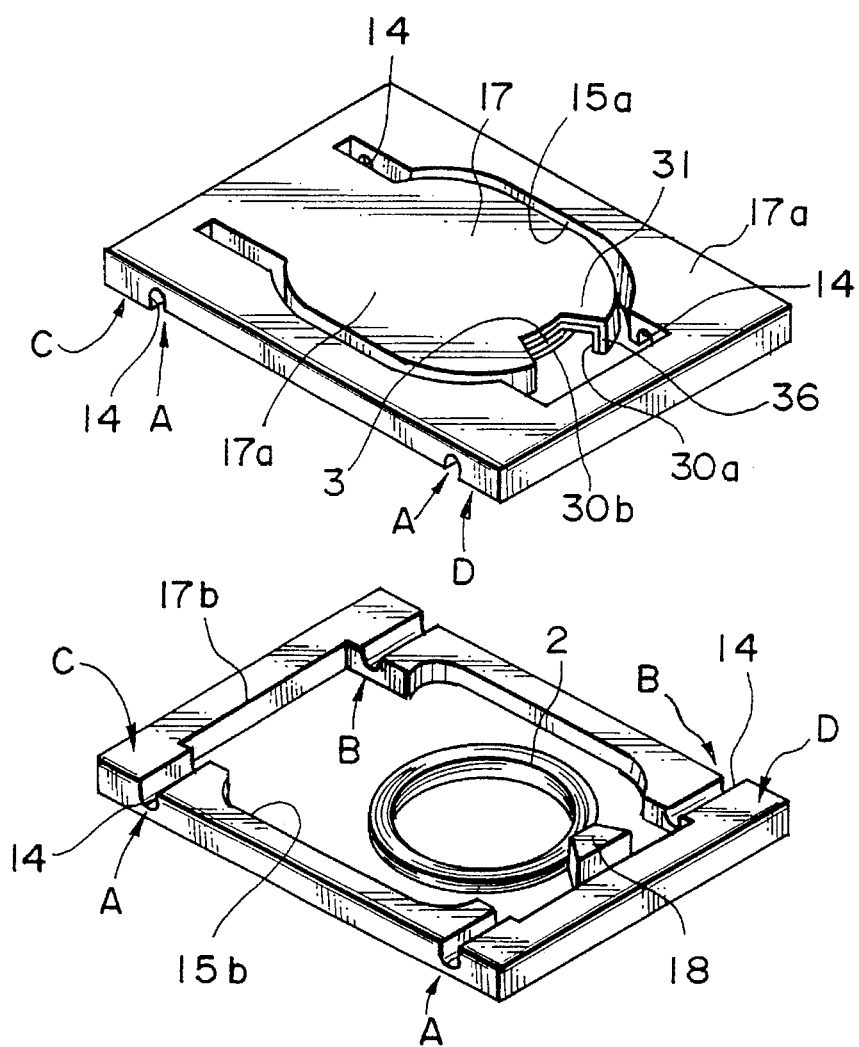
FIG. 14 is an exploded perspective view of a fifth embodiment, in which two parallel four-bar linkages are used, each linkage having turning pairs that are formed from plastic thin plates without using leaf springs.
Figure 15:
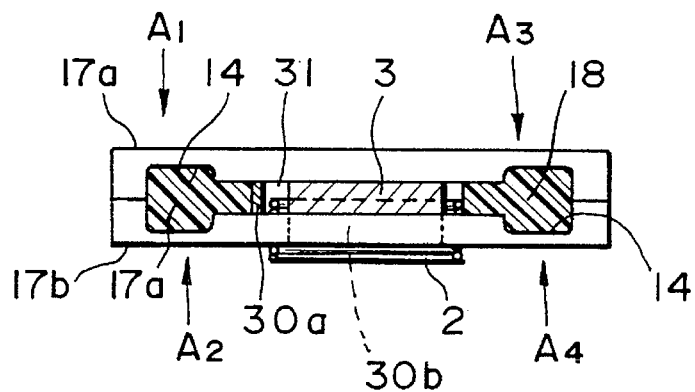
FIG. 15 is a front view showing the assembled state of the sixth embodiment.

FIGS. 14 and 15 are an exploded perspective view and a side view of a vibration generator according to a sixth embodiment of this invention. The vibration generator of this embodiment is characterized in that the vibratable member is in the form of a synthetic resin box. The box comprises upper and lower casings 17*a*, 17*b* situated in opposed relationship to each other. The upper casing 17*a* has a generally U-shape slit 15*a* at the central portion, and cutaway grooves 14 near the opposite end portions. The lower casing 17*b* has an opening 15*b* in the central portion, four cutaway grooves 14 near the opposite end portions, and a supporting portion 18 projecting inwardly from one end of the opening 15*b*. Inside the upper casing 17*a*, a circular permanent magnet 3 of samarium cobalt and outer and inner yokes 30*a*, 30*b* are accommodated. A coil 2 is attached to the distal end of the supporting portion 18 of the lower casing 17*b*. Inside a cup 17 defined by the generally U-shape slit 15*a*, the cup-shape outer yoke 30*a* is supported. Inside the outer yoke 30*a*, a cylindrical rare earth magnet 3 having a diameter smaller than that of the coil 2 and the inner yoke 30*b* placed over the magnet 3 are mounted. The cylindrical coil 2 to be inserted in a magnetic gap 31 between the outer and inner yokes 30*a*, 30*b* is fixed to the distal end of the supporting portion 18. The cup-shape outer yoke 30*a* has in the side wall a cutaway 36 through which the supporting portion 18 extends. The upper and lower casings 17*a*, 17*b* are joined together at their Joining surfaces C, D such as by gluing or ultrasonic welding. This embodiment, like the fourth embodiment, is characterized in that the coil 2 is supported by the supporting portion 18 projecting centrally from the lower casing 17*b*.

Figure 16:
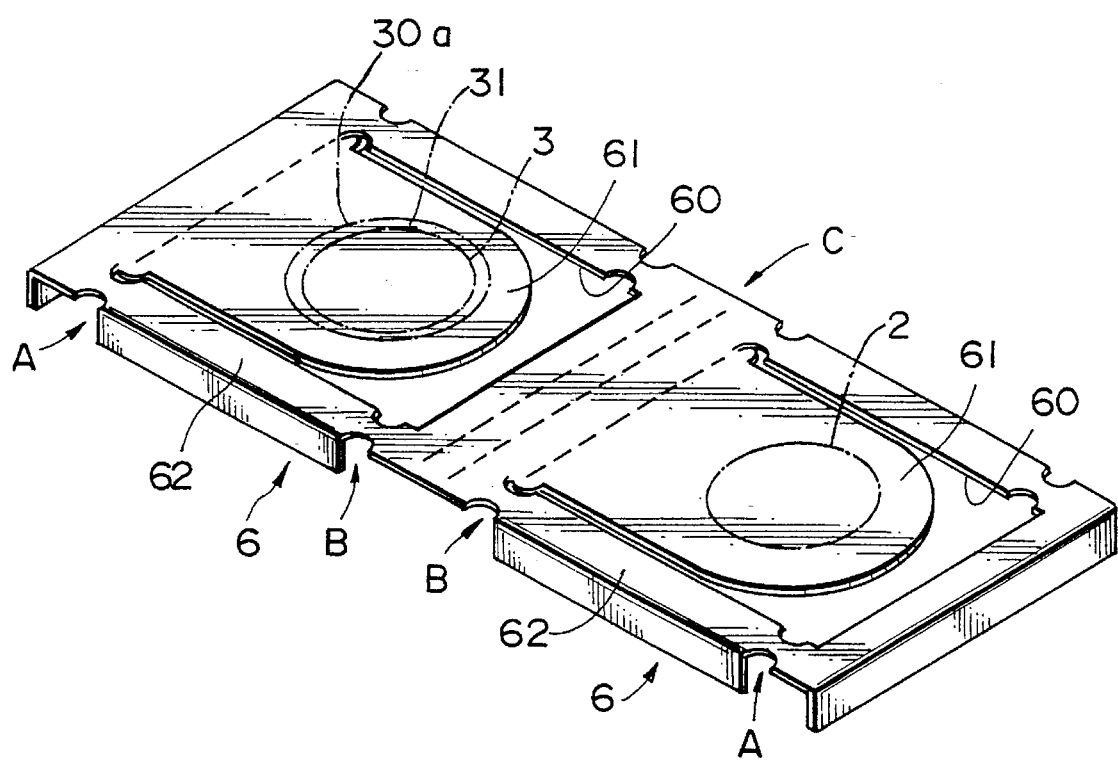
FIG. 16 is a perspective view showing a seventh embodiment, in which parallel four-bar linkages are formed by bending a single sheet of leaf spring.

In this embodiment, it is possible to assign the role of the vibrating member, which connects the coil and the permanent magnet with one another, to the synthetic resin casings 17*a*, 17*b*. In FIG. 16, portions A, B which are thin due to the cutaways 14 serve as springs constituting turning pairs corresponding to the Joint portions of the two parallel four-bar linkages. With this arrangement, a compact vibration generator which is small in thickness and low in cost can be realized. In order to improve its vibration and durability characteristics, the resilient portions may be metallic thin leaf springs, or carbon fibers may be insert molded or glued as needed.

As a modification of the fifth embodiment, by bending a single plate uniquely, it is possible to obtain a structure for holding and vibrating the coil 2, the permanent magnet 3 and the outer and inner yokes 30*a*, 30*b*. In a seventh embodiment of FIG. 16, the plate 6 is bent at predetermined portions to form a pair of casings 62 having an identical shape in which a U-shape slit 60 is made centrally in each casing 62 to form a tongue-shape holding strip 61, and the resulting plate 6 is folded about the central position C to obtain opposing upper and lower casings 62. To one of the holding strips 61, the magnet 3 and the outer and inner yokes 30*a*, 30*b* are attached so as to define a magnetic gap 31 between the magnet 3 and the outer yoke 30*a*. To the other holding strip 61, the coil 2 to be inserted in the magnetic gap 31 is attached. A spacer may be inserted inside each end of the casing 62 as needed.

With this embodiment, since the structure for holding and vibrating the coil 2, the permanent magnet 3 and the outer and inner yokes 30*a*, 30*b* is formed only by bending the single plate 6 uniquely, it is possible to guarantee adequate cost reduction.

Figure 17:
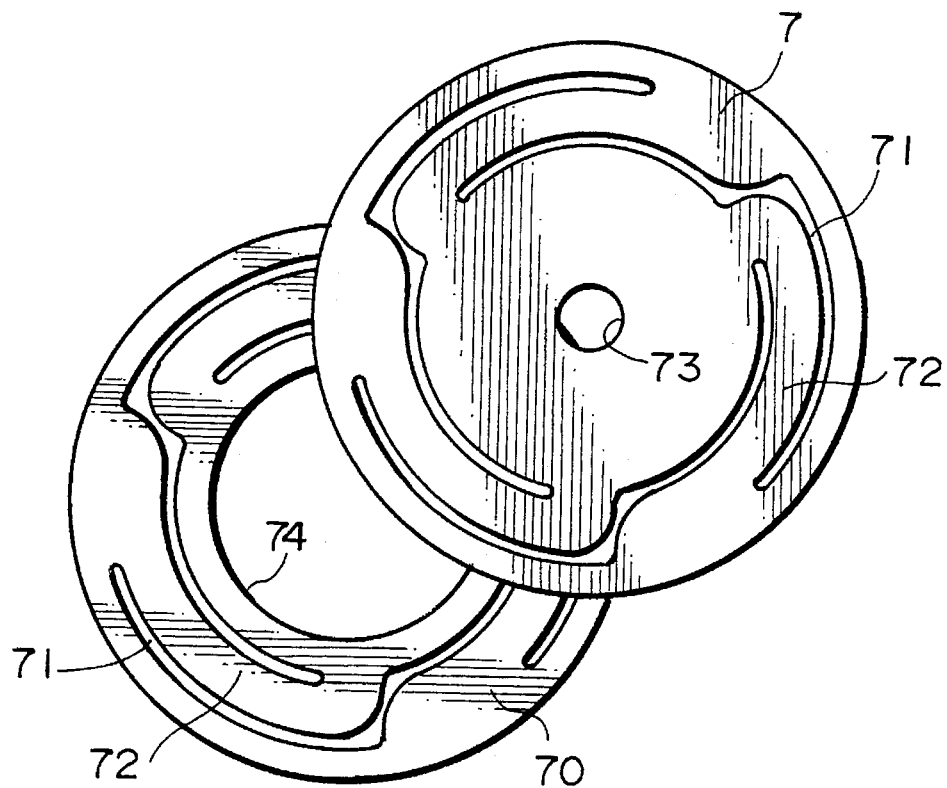
FIG. 17 is an exploded perspective view of an eighth embodiment, in which two parallel support mechanism for supporting a movable member are constituted by two diaphragm springs, showing the two springs spaced apart vertically.
Figure 18:
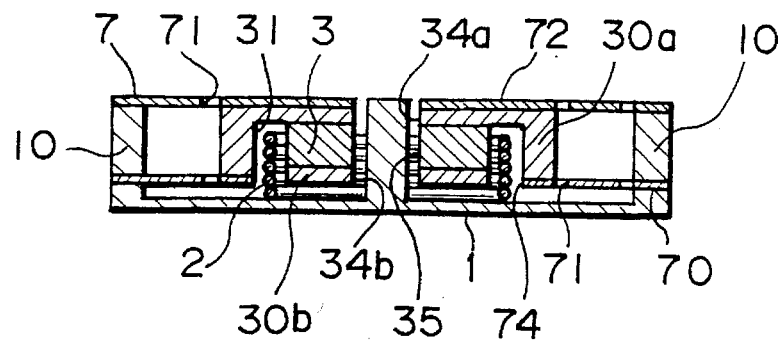
FIG. 18 is a cross-sectional view showing the assembled state of the eighth embodiment.

By modifying the fifth to seventh embodiments, it is possible to obtain a silent warning vibration generator suitable for a very compact and rational portable equipment. In an eighth embodiment of FIGS. 17 and 18, a shaft 16 projects centrally from a disc-shape synthetic resin base 1, and a coil is mounted coaxially about the shaft 16. The disc-shape base 1 has a raised peripheral edge portion on which upper and lower leaf springs 7, 70 are placed one over another via a spacer 10. One of the leaf spring 7 has a central hole 73 through which the shaft 16 is to be inserted, and the other spring 70 has a central opening 74 in which a magnetic gap 31 is to be defined between outer and inner yokes 30*a*, 30*b*. The outer yoke 30*a* has a cup shape with a central hole 34*a*, and an annular samarium cobalt permanent magnet 3 having a diameter smaller than that of the coil 2 and a central hole 35 is mounted in the outer yoke 30*a*. The cylindrical inner yoke 30*b* having a central hole 34*b* of the same diameter as the permanent magnet 3 is placed over the magnet 3 so as to have a magnetic gap 31 around the magnet 3. Thus the coil 2 is inserted in the magnetic gap 31 between the permanent magnet 3 and the inner and outer yokes 30*b*, 30*a*. Each of the leaf springs 7, 70 has three spiral cutouts 71, and the peripheral edge portion and the central portion of the leaf spring 7, 70 are connected with each other by three spiral connecting arms 72. The resulting leaf spring 7, 70 is a grooved diaphragm-type spring which has adequate resilience in the direction perpendicular to the plane of the leaf spring 7, 70 and parallel to the axis of the leaf spring 7, 70 and has adequate rigidity in the direction perpendicular to the axis of the leaf spring 7, 70 in the plane of the leaf spring 7, 70.

Figure 19:
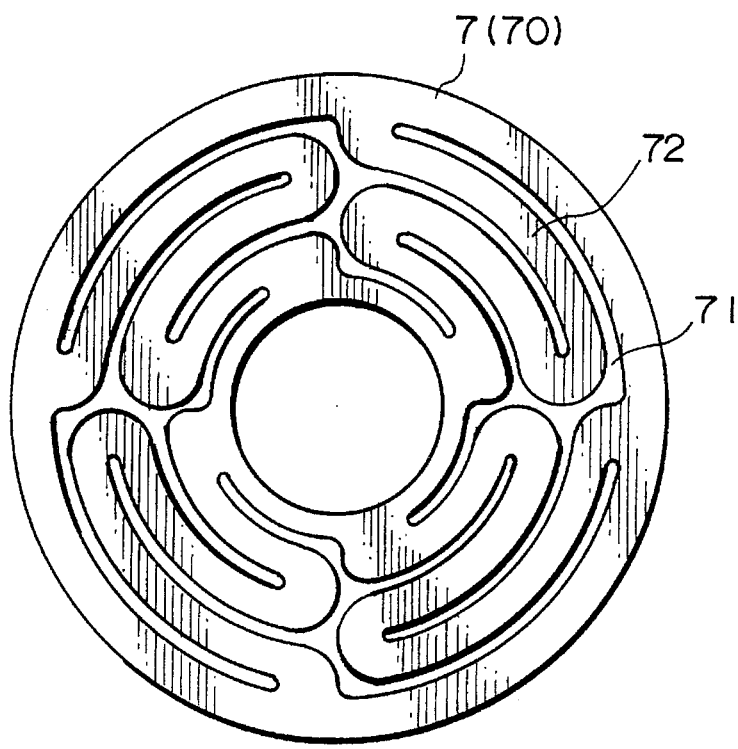
FIG. 19 is a plan view showing an alternative leaf spring in the eighth embodiment.
Figure 20:
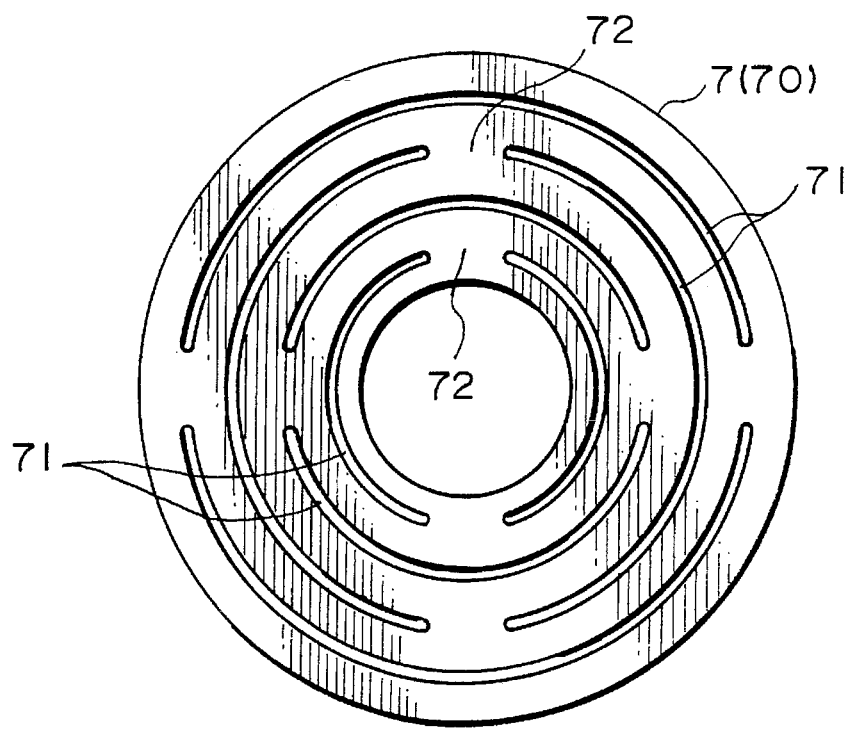
FIG. 20 is a plan view showing another alternative leaf spring in the eighth embodiment.

According to this embodiment, it is possible to obtain a disc-shape vibration generator which is very compact in size and small in thickness, and it is possible to increase the extended length between the peripheral edge portion and the central portion of the leaf spring 7, 70 by providing the spiral connecting arms 72. With this structure, it is possible to generate a large-amplitude vibration easily by a small driving force. Since the two leaf springs 7, 70 are arranged in parallel to each other, it is possible to give a stable linear vibrating motion to the inertial movable member, thus generating a good bodily sensation. In this embodiment, the grooves of the grooved diaphragm-shape spring are spiral. Alternatively, the grooves may have the shape of those of a gimbal spring. Other alternative grooves are shown in FIGS. 19 and 20. The shaft 16 serves to guide the inertial movable member in a stable vibrating motion against turbulence and also to prevent the coil 2 and the outer and inner yokes 30a, 30b from coming into contact with one another and colliding when the portable equipment is dropped on the ground. The guide similar to the shaft 16 may be added to each of the foregoing embodiments. In the fifth and sixth embodiment, by setting a suitable clearance between the respective supporting portion 12, 18 and the corresponding cutaway 36, the above-mentioned result can be expected.

Figure 21:
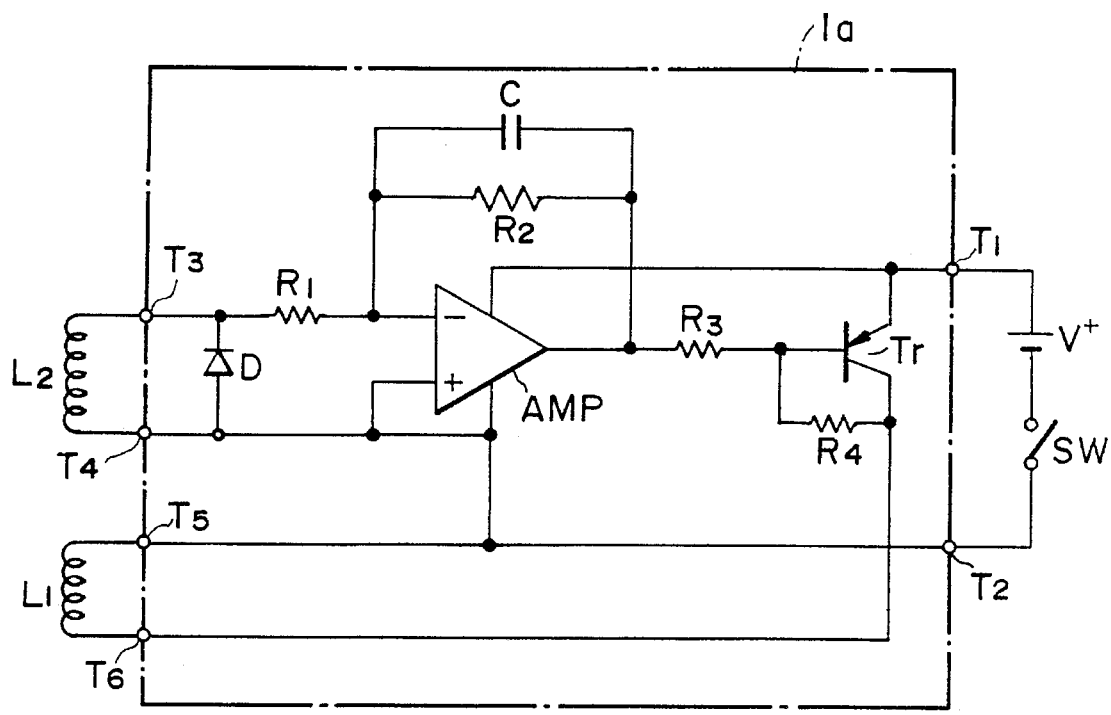
FIG. 21 is a circuit diagram showing a driver circuit suitable for use in this invention.
Figure 22:
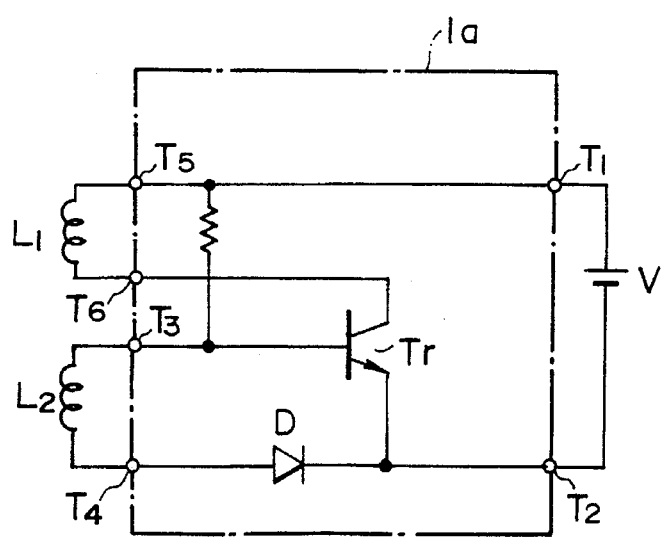
FIG. 22 is a circuit diagram showing an alternative driver circuit suitable for use in the invention.

FIGS. 21 and 22 show electric circuits suitable to the above-mentioned vibration generator.

In FIG. 21, two coils are simultaneously wound; the first coil is used as a driver coil L1, and the second coil is used as a search coil L2. A driver circuit is incorporated basically into the IC 1a. In the circuit of FIG. 21, the IC 1a has two terminals T1, T2 to which a series circuit for a power source V and a power switch SW is connected. The IC 1a also has four terminals T3, T4, T5, T6 to which the driver coil L1 and the search coil L2 are connected. To the search coil L2, a reverse-current preventing diode D is connected in parallel, and a flue search voltage is supplied to the input terminal of an operational amplifier AMP for amplification. To the input and output terminal of the operational amplifier AMP, a parallel circuit of a capacitor C and a resistor R2 is connected. A non-inverting input terminal is connected to the ground.

The output terminal of the operational amplifier AMP is connected to the base of a driver transistor Tr via a resistor R3, and the emitter of the transistor Tr is connected to the positive pole of the power source V via the terminal T1 while the collector of the transistor Tr is connected to the driver coil L1 via the terminal 6. A resistor R4 is connected between the base and collector of the transistor Tr. The other end of the driver coil L1 is connected to the switch SW from the terminals T5, T2.

Therefore, according to the driver circuit of FIG. 21, when the movable member is activated from a stationary state by turning on the switch SW, the power voltage will be supplied to the emitter of the transistor Tr. At that time, since the collector of the transistor Tr is connected to the driver coil L1, the driving current will be supplied to the driver coil L1 even if a fine base current flow occurs, generating a driving force in respect with the magnet flux existing in the magnetic gap between the coil and the inner and outer yokes to move the movable member. At that time, the search coil L2 generates a detection voltage so that the polarity of this detection voltage will become such a polarity as to switch the transistor Tr off, thus breaking off the current flow to the coil L1. As a result, the movable member will restore to its original position by the restoring force of the supporting portion. At that time, the search coil L2 generates a detection voltage so that a large driving current will be supplied again to the driver coil L1 if the polarity of this detection voltage is such a polarity as to drive the transistor Tr.

With the driver circuit of FIG. 21, the vibration generator starts self-excited vibration of the movable member by its natural resonant frequency, enabling continuous vibration in a resonant state.

Likewise the driver circuit of FIG. 22 includes a driver coil L1 and a search coil L2 and enables the same self-excited vibration.

This invention should by no means be limited to the foregoing embodiments. For example, since the kind and shape of the magnet can be selected as desired, it is possible to use a ferrite magnet instead of the rare earth magnet. Further, since the kind and shape of the coil can be selected as desired, the coil should not be limited to the loop shape and may include parallel conductors crossing the magnetic flux with the same result. Furthermore, since the kind of the driving current of the coil, the pulse and the alternating current may be selected as desired, a switching mechanism used in a buzzer may be added to cause a self-excited oscillation. In view of the natural vibration frequency of the vibratable member, it is preferable to adjust the frequency. The frequency may be switched over among a number of values. By adding a circuit for automatically making the amplitude of the vibration constant, it is possible to give a stable bodily sensation. The vibratable member should not be limited to a plate shape and may be a rod shape or a spiral shape. Since the generator is adequately thin, it is possible to place two kinds of generators of different vibration frequencies one over another. This invention can be used in a wide range of applications in addition to a pager, such as a burglar alarm, a watch's time alarm and a portable telephone's call device.

According to this invention, it is possible to provide a silent warning vibration generator, for a portable equipment, which is easy to manufacture, low in cost, small in size and thickness, has low electric power consumption, less mechanical loss, is free of electromagnetic wave noise due to sparking, has long life and enables limiting the direction of vibration to a predetermined direction for bodily sensation, eliminating the foregoing problems with the conventional art in which a mass-eccentric weight is attached to the driving shaft of a motor. In this vibration generator, since the inertial movable member having the permanent magnet and the yokes defining a magnetic gap and the conductor inserted in the magnetic gap in a non-contact state so as to cross magnetic flux in the magnetic gap are connected with each other via the vibrating member to cause a relative vibration when a current flows in the conductor, the Lorentz force will occur between the conductor and the permanent magnet in response to the current flow into the conductor to cause the vibrating member to deform, thus generating a vibration in the generator.

What is claimed is:

1. A silent warning vibration generator for a portable equipment, comprising:

(a) a base;

(b) an internal movable member vibratably supported on said base via a single leaf spring and having a disc-shape inner yoke, an outer yoke situated outside said inner yoke with a magnetic gap, and a permanent magnet for causing magnetic flux in said magnetic gap; and (c) a coil mounted on said base so as to cross the magnetic flux in said magnetic gap, whereby said internal movable member will vibrate when an electric current flows In said coil.

2. A silent warning vibration generator according to claim 1, wherein said inertial movable member has a groove or a projection, said base having a companion projection or a companion groove in such a position as to loosely engage said groove or protection of said inertial movable member so that possible turbulence is suppressed to keep said coil free from being broken due to the turbulence.

3. A silent warning vibration generator according to claim 1, wherein said leaf spring is composed of a central portion and a turnover side portion so as to have an increased extended length.

4. A silent warning vibration generator according to claim 3, wherein a part of a side portion of said leaf spring is bent and expanded to form said base for supporting said coil.

5. A silent warning vibration generation for a portable equipment, comprising:

(a) a base;

(b) an internal movable member having a disc-like inner yoke, an outer yoke situated outside inner yoke with a magnetic gap, and a permanent magnet for causing magnetic flux in said magnetic gap;

(c) a support supporting said movable member for vibration with respect too said base, said support being a pair of four-bar linkages having resilient turning pairs clamping said coil to support said movable member; and (d) a coil mounted on said base so as to cross the magnetic flux in said magnetic gap, whereby said movable member will vibrate when an electric current flows in said coil.

6. A silent warning vibration generator according to claim 5, wherein said support is composed of two frame-shape leaf springs spaced apart from each other, a first bar-forming plate fixing one side of each of said leaf springs to said base, a second bar-forming plate fixing another side of each said leaf spring to said outer yoke, and a third bar-forming plate making the remaining sides except the flexible sections rigid.

7. A silent warning vibration generator according to claim 5, further comprising a shaft supported on a base, said inertial movable member having a guide hole through which said shaft loosely extends so that possible turbulence is suppressed to keep said coil free from being broken due to the turbulence.

8. A silent warning vibration generator for a portable equipment, comprising:

(a) an inertial movable member having a permanent magnet and a yoke defining a magnet gap;

(b) a coil situated so as to cross magnetic flux in said magnetic gap; and (c) a support supporting said movable member in such a manner that said coil and said magnetic gap are vibratable relative to each other, said support being a four-bar linkage structure having turning pairs including leaf springs, whereby said movable member will vibrate when an electric current flows in said coil.

9. A silent warning vibration generator according to claim 8, wherein each pair of said turning pairs has such a structure that opposite ends of each of said leaf springs are pushed by bar-forming sections of said four-bar linkage structure.

10. A silent warning vibration generator according to claim 9, wherein said turning pairs and the corresponding bars are integrally connected by strip sections.

11. A silent warning vibration generator according to claim 8, wherein said turning pairs and the corresponding bars are integrally molded of resin.

12. A silent warning vibration generator according to claim 9, wherein said turning pairs and the corresponding bar are integrally molded of resin.

* * * * *